(12) United States Patent
Raman

(10) Patent No.: US 9,986,276 B2
(45) Date of Patent: May 29, 2018

(54) AUTHENTICATION SYSTEM AND METHOD OF OPERATING THE SAME

(71) Applicant: HANWHA TECHWIN CO.,LTD., Changwon-Si (KR)

(72) Inventor: Sujith Kunhi Raman, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 291 days.

(21) Appl. No.: 14/164,822

(22) Filed: Jan. 27, 2014

(65) Prior Publication Data

US 2014/0298368 A1    Oct. 2, 2014

(30) Foreign Application Priority Data

Mar. 27, 2013  (KR) .................. 10-2013-0033093

(51) Int. Cl.
*G06F 7/04* (2006.01)
*H04N 21/258* (2011.01)
(Continued)

(52) U.S. Cl.
CPC ..... *H04N 21/25816* (2013.01); *H04L 9/3228* (2013.01); *H04L 63/0876* (2013.01); *H04L 9/3297* (2013.01); *H04L 63/083* (2013.01); *H04L 63/108* (2013.01); *H04L 67/02* (2013.01); *H04L 69/22* (2013.01);
(Continued)

(58) Field of Classification Search
CPC ... H04L 63/08; H04L 63/083; H04L 63/0846; G06F 21/30; G06F 21/31
See application file for complete search history.

(56) References Cited

U.S. PATENT DOCUMENTS 5,737,421 A * 4/1998 Audebert ............. G06Q 20/341
285/382
2003/0093705 A1* 5/2003 Kriz ........................ G06F 1/14
713/600
(Continued)

FOREIGN PATENT DOCUMENTS

JP          2004-40273 A     2/2004
KR    10-2005-0025872 A     3/2005

OTHER PUBLICATIONS

Baek, et al., "Design and Implementation of Device Management Service Using ONVIF Standard in Network Camera", Kyonggi University Dept. of Computer Science, vol. 39, No. 1(A), 2012, 4 pgs. total.

*Primary Examiner* — Shewaye Gelagay
*Assistant Examiner* — Carlton Johnson
(74) *Attorney, Agent, or Firm* — Sughrue Mion, PLLC

(57) ABSTRACT

Provided are an authentication system and a method of operating the authentication system. The authentication system allows network cameras to authenticate an image storage device as a client. The authentication system includes an authentication preprocessing unit provided in the client to calculate and store an offset time representing a difference between time information of the client and time information that is received from a network camera in response to a time information request to the network camera, and an authentication processing unit provided in the network camera to authenticate the client by receiving authentication information including the offset time from the client in response to an authentication request of the client.

17 Claims, 5 Drawing Sheets

(51) Int. Cl.
  *H04L 9/32* (2006.01)
  *H04N 7/18* (2006.01)
  *H04N 21/2187* (2011.01)
  *H04N 21/2747* (2011.01)
  *H04L 29/06* (2006.01)
  *H04L 29/08* (2006.01)

(52) U.S. Cl.
  CPC .......... *H04L 2463/121* (2013.01); *H04N 7/18* (2013.01); *H04N 21/2187* (2013.01); *H04N 21/2747* (2013.01)

(56) References Cited

U.S. PATENT DOCUMENTS

| | | | |
|---|---|---|---|
| 2007/0011093 A1* | 1/2007 | Tree | G06Q 20/02 705/40 |
| 2008/0106597 A1* | 5/2008 | Amini | H04N 7/181 348/143 |
| 2008/0270791 A1* | 10/2008 | Nystrom | H04L 9/0863 713/159 |
| 2012/0047563 A1* | 2/2012 | Wheeler | G06F 21/335 726/6 |
| 2012/0210408 A1* | 8/2012 | Lu | H04L 63/0846 726/6 |

\* cited by examiner

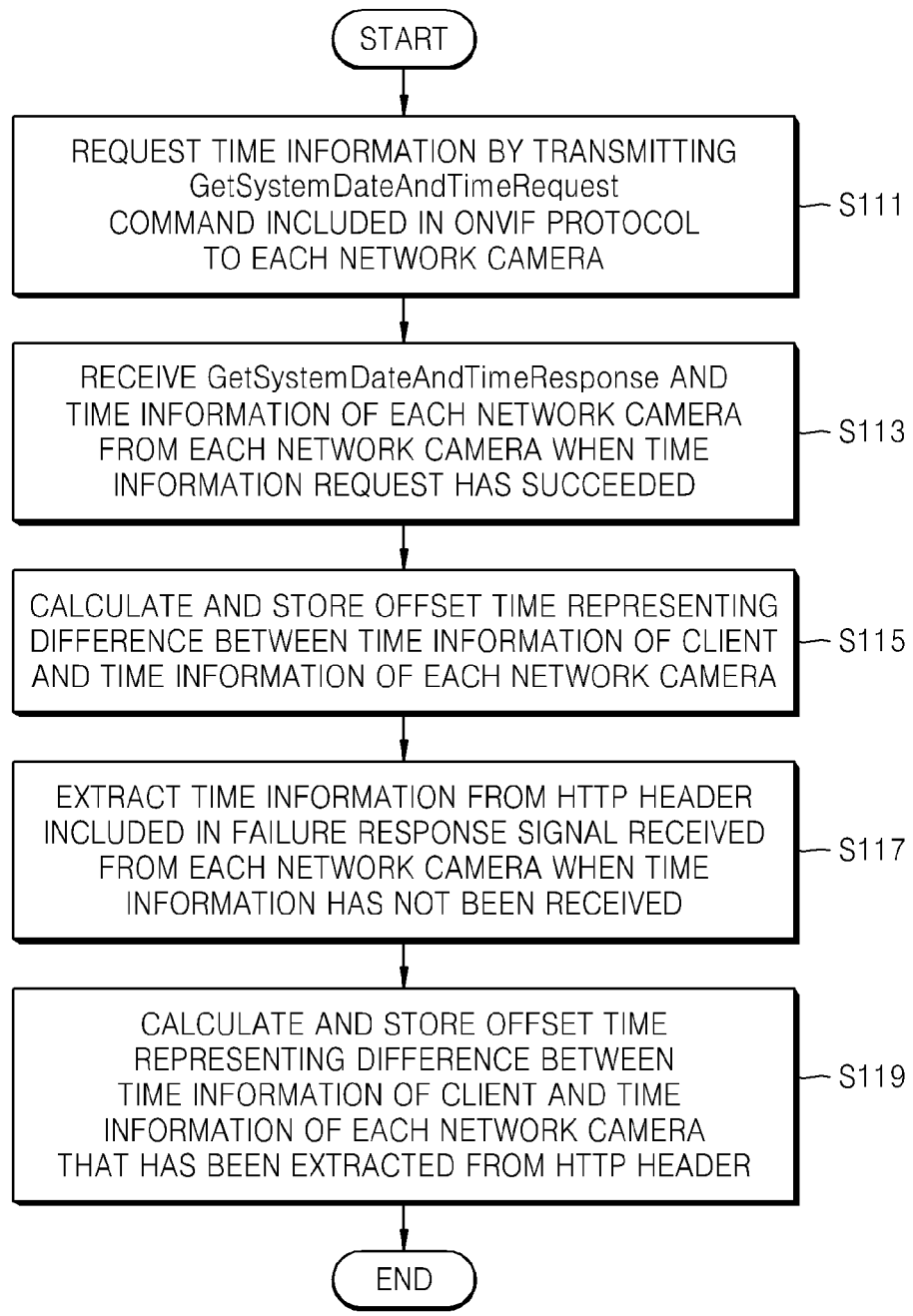

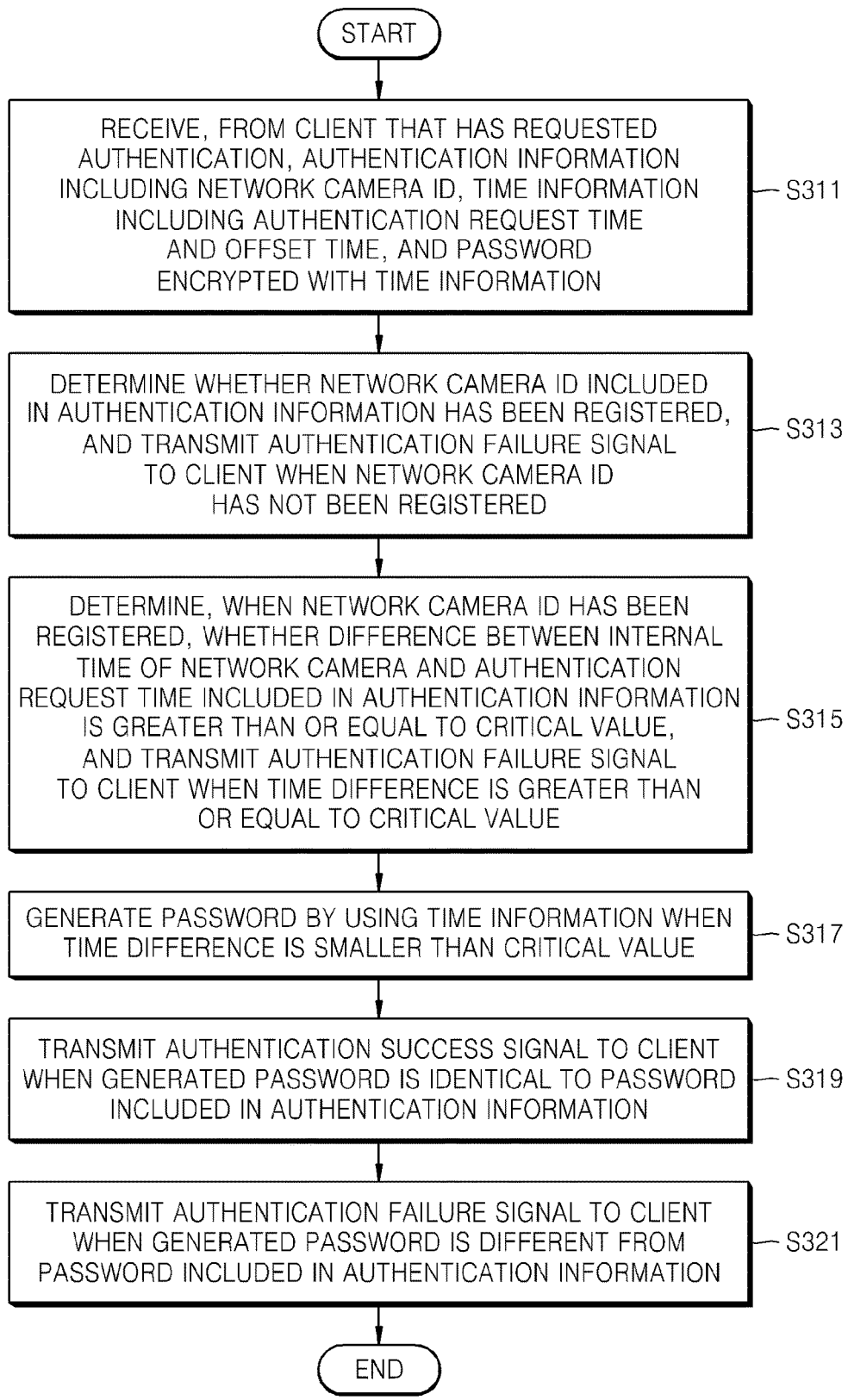

AUTHENTICATION SYSTEM AND METHOD OF OPERATING THE SAME

CROSS REFERENCE TO RELATED APPLICATION

This application claims priority from Korean Patent Application No. 10-2013-0033093, filed on Mar. 27, 2013, in the Korean Intellectual Property Office, the disclosure of which is incorporated herein in its entirety by reference.

BACKGROUND

1. Field

Apparatuses and methods consistent with exemplary embodiments of the inventive concept relate to an authentication system which allows a network camera (which operates as a server) to authenticate an image processing device (which operates as a client), such as a network video camera, based on an Open Network Video Interface Forum (ONVIF) protocol.

2. Description of the Related Art

A network video recorder (NVR) uses an Open Network Video Interface Forum (ONVIF) protocol to store and monitor images received from network cameras and manage the network cameras. In comparison with a digital video recorder (DVR), since the NVR uses a network line instead of a video cable for transmitting an analog video signal from a camera, a system including the NVR may be simplified, however, a complex network configuration is required to be set between several devices.

That is, since a network camera acts as a server and an NVR acts as a client in a server-client model, an external device should undergo an authentication process in order to access the network camera acting as a server.

SUMMARY

One or more exemplary embodiments of the present inventive concept provide an authentication system which allows a network camera to authenticate a client by using offset time information between the network camera and the client, and a method of operating the same.

Various aspects will be set forth in part in the description which follows and, in part, will be apparent from the description, or may be learned by practice of the presented embodiments.

According to an aspect of an exemplary embodiment, there is provided an authentication system that allows at least one network camera to authenticate an image storage device as a client. The authentication system may include: an authentication preprocessing unit provided in the client to calculate and store an offset time representing a difference between time information of the client and time information that is received from a network camera in response to a time information request to the network camera; and an authentication processing unit provided in the network camera to authenticate the client by receiving authentication information including the offset time from the client in response to an authentication request of the client.

The authentication preprocessing unit may periodically calculate and update the offset time.

The authentication preprocessing unit may include: a requesting unit configured to request the time information from the network camera by transmitting a GetSystemDateAndTimeRequest command included in an Open Network Video Interface Forum (ONVIF) protocol to the network camera; and a calculating unit configured to receive GetSystemDateAndTimeResponse and the time information of the network camera from the network camera and calculate the offset time.

The authentication preprocessing unit may further include an extracting unit configured to extract the time information of the network camera from a Hypertext Transfer Protocol (HTTP) header included in a failure response signal received from the network camera, if the client does not receive the time information of the network camera from the network camera.

The calculating unit may calculate the offset time representing a difference between the time information of the client and the time information of the network camera extracted from the HTTP header.

The authentication processing unit may include: a receiving unit configured to receive from the client the authentication information including a network camera identification (ID), time information including an authentication request time and an offset time, and a password encrypted with the time information including the authentication request time and the offset time; a generating unit configured to generate a password by using the time information including the authentication request time and the offset time; and a control unit configured to transmit an authentication success signal to the client if the password is identical to the password included in the authentication information.

The control unit may transmit an authentication failure signal to the client if the network camera ID included in the authentication information has not been registered in the network camera, if a difference between an internal time of the network camera and the authentication request time included in the authentication information is greater than or equal to a critical value, or if the generated password is different from the password included in the authentication information.

According to an aspect of another exemplary embodiment, there is provided a method of operating an authentication system that allows at least one network camera to authenticate an image storage device as a client. The method may include: an authentication preprocessing operation of calculating and storing an offset time representing a difference between time information of the client and time information that is received from a network camera in response to a time information request to the network camera; and an authentication processing operation of authenticating the client by receiving authentication information including the offset time from the client at an authentication request of the client.

The authentication preprocessing operation may include periodically calculating and updating the offset time.

The authentication preprocessing operation may include: requesting the time information from the network camera by transmitting a GetSystemDateAndTimeRequest command included in an Open Network Video Interface Forum (ONVIF) protocol to the network camera; receiving GetSystemDateAndTimeResponse and the time information of the network camera from the network camera; and calculating the offset time.

The authentication preprocessing operation may further include: extracting the time information of the network camera from a Hypertext Transfer Protocol (HTTP) header included in a failure response signal received from the network camera, if the time information of the network camera has not been received; and calculating the offset time representing a difference between the time information of the client and the time information of the network camera extracted from the HTTP header.

The authentication processing operation may include: receiving the authentication information including a network camera identification (ID), time information including an authentication request time and an offset time, and a password encrypted with the time information including the authentication request time and the offset time from the client that has requested authentication; generating a password by using the time information including the authentication request time and the offset time; and transmitting an authentication success signal to the client if the password is identical to the password included in the authentication information.

The authentication processing operation may further include: determining whether the network camera ID included in the authentication information has been registered in the network camera; and transmitting an authentication failure signal to the client if the network camera ID included in the authentication information has not been registered in the network camera.

The authentication processing operation may further include: if the network camera ID included in the authentication information has been registered in the network camera, determining whether a difference between an internal time of the network camera and the authentication request time included in the authentication information is greater than or equal to a critical value; and generating the password if the difference between the internal time of the network camera and the authentication request time included in the authentication information is smaller than the critical value, and transmitting an authentication failure signal to the client if the difference between the internal time of the network camera and the authentication request time included in the authentication information is greater than or equal to the critical value.

The authentication processing operation may further include transmitting an authentication failure signal to the client if the password is different from the password included in the authentication information.

BRIEF DESCRIPTION OF THE DRAWINGS

These and/or other aspects will become apparent and more readily appreciated from the following description of the exemplary embodiments, taken in conjunction with the accompanying drawings, in which:

FIG. 4 is a detailed flowchart illustrating an authentication preprocessing operation illustrated in FIG. 3, according to an exemplary embodiment; and FIG. 5 is a detailed flowchart illustrating an authentication processing operation illustrated in FIG. 3, according to an exemplary embodiment.

DETAILED DESCRIPTION OF EXEMPLARY EMBODIMENTS

Figure 1:
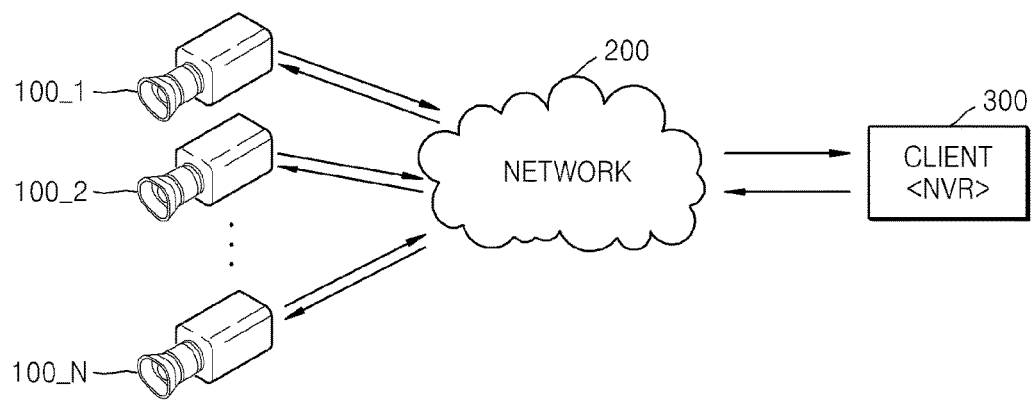
FIG. 1 is a block diagram illustrating a configuration of an image security system, according to an exemplary embodiment.

Reference will now be made in detail to exemplary embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

It will be understood that the present inventive concept is not limited to the embodiments described herein and includes all modifications, equivalents and substitutions falling within the spirit and scope of the inventive concept. In the following description, detailed descriptions of well-known functions or configurations will be omitted since they would unnecessarily obscure the subject matters of the inventive concept.

Although terms such as "first" and "second" may be used herein to describe various elements or components, these elements or components should not be limited by these terms. These terms are only used to distinguish one element or component from another element or component.

The terms used herein are for the purpose of describing the embodiments only and are not intended to be limiting of the inventive concept. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

The embodiments of the inventive concept may be described in terms of functional block components and various processing operations. Such functional blocks may be implemented by any number of hardware and/or software components that execute particular functions. For example, the embodiments may employ various integrated circuit (IC) components, such as memory elements, processing elements, logic elements, and lookup tables, which may execute various functions under the control of one or more microprocessors or other control devices. Similarly, where the elements of the inventive concept are implemented by software programming or software elements, the embodiments may be implemented by any programming or scripting language such as C, C++, Java, or assembly language, with various algorithms being implemented by any combination of data structures, processes, routines, or other programming elements. Functional aspects may be implemented by an algorithm that is executed in one or more processors. Also, the embodiments may employ the related art for electronic environment setting, signal processing, and/or data processing. Terms such as "mechanism," "element," "unit," and "configuration" may be used in a broad sense, and are not limited to mechanical and physical configurations. The terms may include the meaning of software routines in conjunction with processors or the like.

According to an exemplary embodiment, a network camera authenticates a network video recorder (NVR) via User-Token authentication provided according to the ONVIF protocol. To this end, the NVR transmits request information and UserToken (authentication) information to the network camera. The UserToken information includes a network camera identification (ID), an authentication request time (request generation time), and an encrypted password.

The network camera compares the received authentication request time with an internal time of the network camera. When a difference between the received authentication request time and the internal time of the network camera is smaller than a critical value, the network camera generates a password by using the received authentication request time. Then, the network camera compares the generated password with the password received from the NVR. When the generated password is identical to the received password, the network camera determines that the authentication has succeeded, and responds to the NVR's request.

On the other hand, when the difference between the received authentication request time and the internal time of the network camera is greater than or equal to the critical value, the network camera determines that the authentication has failed, and transmits an authentication failure signal to the NVR. In this case, a user has to perform an authentication process again after setting a time of the network camera.

FIG. 1 is a block diagram illustrating a configuration of an image security system, according to an exemplary embodiment.

Referring to FIG. 1, an image security system includes first to Nth network cameras 100 (100_1 to 100_N), a network 200, and a client 300 as an image processing device. The client 300 may be an NVR.

The first to Nth network cameras 100 (100_1 to 100_N) (hereinafter referred to as network camera 100) may be Web cameras or Internal Protocol (IP) cameras. The network camera 100 digitalizes and compresses an image based on a high-performance embedded system including a charge-coupled device (CCD) device, and transmits the resulting data through the network 200, thereby enabling a user to restore and view the image through the Internet in real time. The network camera 100 has a unique IP address and has a server program installed therein. The client 300 logs in the server through the IP address and receives an image from the network camera 100. Examples of the network camera 100 include a fixed camera having a fixed body including a camera lens and a mobile camera having a body capable of panning and tilting.

The client 300 may transmit, store, and monitor an image of a monitoring area by using the Internet protocol. The client 300 may receive an image from the network camera 100, of which authentication has succeeded, and store and monitor the image. In this case, the network camera 100 and the client 300 perform communication based on the ONVIF protocol.

The ONVIF protocol refers to a standard protocol that is designated by the ONVIF, which defines network image security equipment international standards, to address protocol incompatibility of network cameras.

The ONVIF protocol is a message exchange protocol between the network camera 100 and the client 300, which is defined by the ONVIF. Basically, the ONVIF protocol operates based on a Web service and exchanges response-request messages by using a Simple Object Access Protocol (SOAP). Also, the ONVIF protocol provides protocols for attribute setting of the network camera 100, network participation of the network camera 100, discovery of the network camera 100, and registration of the network camera 100, and also provides a video streaming scheme.

Figure 2:
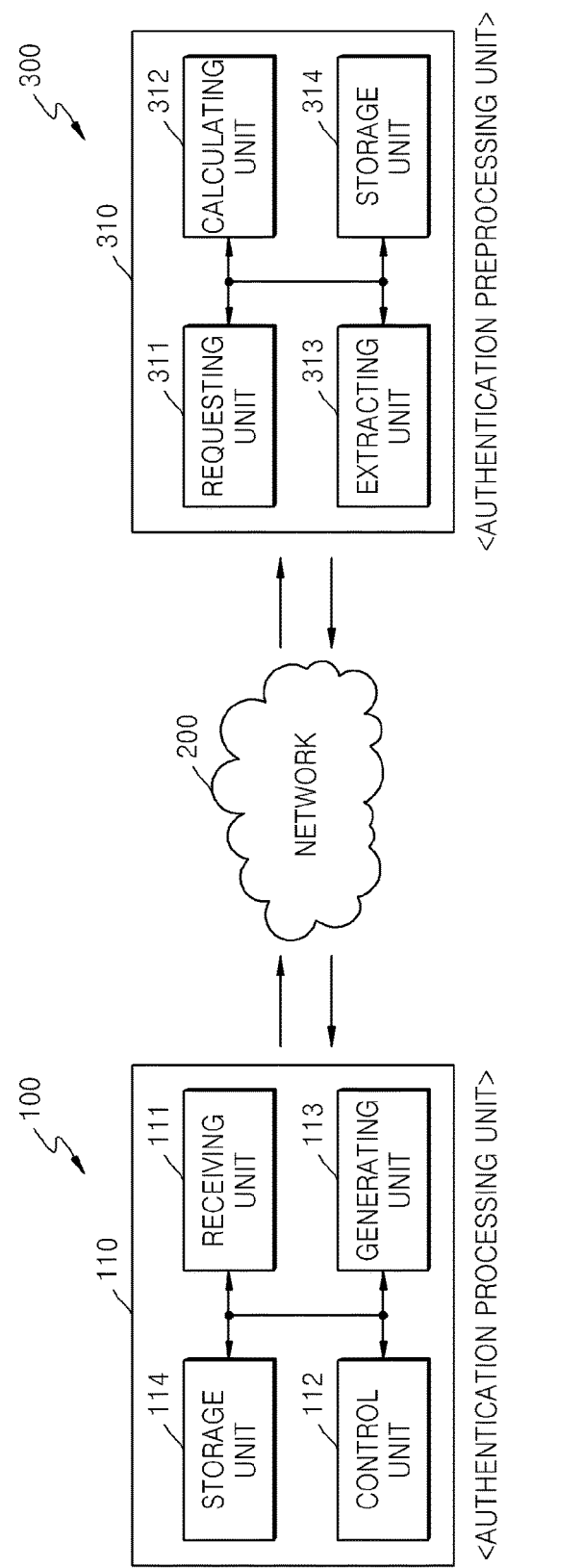
FIG. 2 is a block diagram illustrating a configuration of an authentication system according to an exemplary embodiment.

FIG. 2 is a block diagram illustrating a configuration of an authentication system according to an exemplary embodiment.

Referring to FIG. 2, the authentication system includes an authentication preprocessing unit 310 and an authentication processing unit 110. The authentication preprocessing unit 310 may be provided in the client 300, and the authentication processing unit 110 may be provided in each network camera 100.

The authentication preprocessing unit 310 calculates and stores an offset time representing a difference between time information of the client 300 and time information that is received from each network camera 100 in response to a time information request to each network camera 100.

The authentication processing unit 110 authenticates the client 300 by receiving authentication information including the offset time from the client 300 in response to an authentication request of the client 300.

The authentication preprocessing unit 310 may include a requesting unit 311, a calculating unit 312, an extracting unit 313, and a storage unit 314.

The requesting unit 311 requests time information from each network camera 100. The requesting unit 311 may receive the time information from each network camera 100 by using a GetSystemDateAndTimeRequest command included in the ONVIF protocol.

When each network camera 100 receives a time information request from the requesting unit 311, each network camera 100 converts time information of each network camera 100 into a universal time check (UTC) format and transmits the UTC time information. The calculating unit 312 calculates an offset time representing a difference between the time information of the client 300 and the time information of each network camera 100 received from each network camera 100, and stores the calculated offset time in the storage unit 314. Here, each network camera 100 transmits GetSystemDateAndTimeResponse+Time Information with the time information of each network camera 100 to the calculating unit 312. The offset time is a time bias, and may be time difference information that is obtained by subtracting the received time information of each network camera 100 from the time information of the client 300. In detail, the calculating unit 312 calculates a first offset time by subtracting the received first time information of the first network camera 100_1 from the time information of the client 300 and stores the first offset time in the storage unit 314, and calculates a second offset time by subtracting the received second time information of the second network camera 100_2 from the time information of the client 300 and stores the second offset time in the storage unit 314, thereby calculating and storing the offset time about each network camera 100.

When the requesting unit 311 does not receive time information in response to the time information request, the extracting unit 313 extracts time information from a Hypertext Transfer Protocol (HTTP) header included in a failure response signal received from each network camera 100. When each network camera 100 receives a time information request signal from the requesting unit 311, and then, fails to provide the same, each network camera 100 transmits a response signal to the client 300. Here, the response signal indicates inability to transmit the time information and includes HTTP header information, according to an exemplary embodiment. Therefore, the extracting unit 313 may extract the time information of each network camera 100 from the HTTP header in this embodiment.

When the extracting unit 313 extracts the time information of each network camera 100 from the HTTP header, the calculating unit 312 calculates an offset time representing a difference between the time information of the client 300 and the time information of each network camera 100 extracted from the HTTP header, and stores the calculated offset time in the storage unit 314.

The authentication preprocessing unit 310 may periodically request time information from each network camera 100, calculate an offset time, and update the offset time repeatedly.

When the authentication preprocessing operation is completed, the network camera 100 may perform an authentication processing operation on the client 300.

The authentication processing unit 110 may include a receiving unit 111, a control unit 112, a generating unit 113, and a storage unit 114. The authentication processing unit 110 authenticates the client 300 by UserToken authentication.

The receiving unit 111 receives from the client 300 an authentication request signal and authentication information including a network camera ID, time information including an authentication request time and an offset time, and a password encrypted with the time information including the authentication request time and the offset time. The authentication information including the network camera ID, the time information including the authentication request time and the offset time, and the password encrypted with the time information may be UserToken information. Also, the time information including the authentication request time and the offset time may be a time that is obtained by adding the authentication request time and the offset time.

The control unit 112 determines whether the network camera ID included in the authentication information (i.e., the UserToken information) has been registered in the network camera 100, and transmits an authentication failure signal to the client 300 if the network camera ID included in the authentication information has not been registered in the network camera 100. If, however, the network camera ID has been registered in the network camera 100, the control unit 112 determines whether a difference between an internal time of the network camera 100 and the authentication request time included in the authentication information is greater than or equal to a critical value. If the difference between the internal time of the network camera 100 and the authentication request time included in the authentication information is greater than or equal to the critical value, the control unit 112 transmits an authentication failure signal to the client 300.

If the difference between the internal time of the network camera 100 and the authentication request time included in the authentication information is smaller than the critical value, the generating unit 113 generates a password by using the time information including the authentication request time and the offset time.

The control unit 112 determines whether the password generated by the generating unit 113 is identical to the password included in the authentication information. If the password generated by the generating unit 113 is identical to the password included in the authentication information, the control unit 112 transmits an authentication success signal to the client 300. If, however, the password generated by the generating unit 113 is different from the password included in the authentication information, the control unit 112 transmits an authentication failure signal to the client 300. Upon receiving the authentication success signal, the client 300 may access the network camera 100 and receive and monitor an image from the network camera 100.

Since the client 300 calculates and stores the offset time with respect to the network camera 100 in the authentication preprocessing operation and the network camera 100 authenticates the client 300 by using the offset time, the network camera 100 may rapidly perform an authentication process on the client 300. Also, the time information of the network camera 100 need not be changed even when the authentication fails because the time information of the network camera 100 is not identical to the time information of the client 300. Also, a plurality of clients 300 with different internal times may access one network camera 100.

Hereinafter, a method of operating the authentication system according to an exemplary embodiment will be described with reference to FIGS. 3 to 5.

An image security method according to this embodiment may be performed in the image security system as illustrated in FIGS. 1 and 2. In the following description, the same descriptions as presented with respect to FIGS. 1 and 2 will be omitted.

Figure 3:
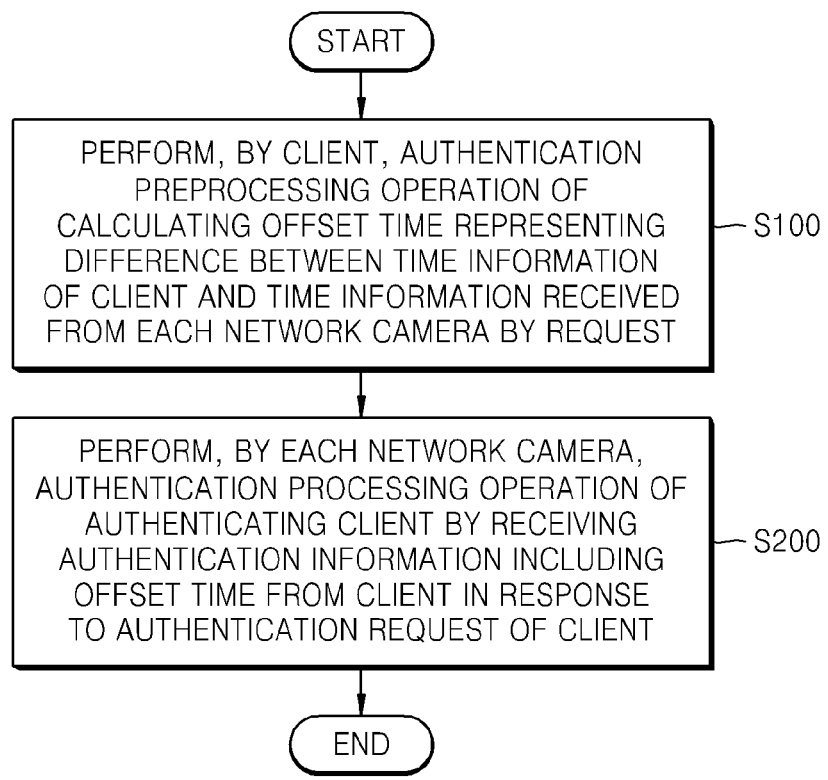
FIG. 3 is a flowchart illustrating a method of operating the authentication system according to an exemplary embodiment.

FIG. 3 is a flowchart illustrating a method of operating the authentication system according to an exemplary embodiment.

Referring to FIG. 3, the client 300 performs an authentication preprocessing operation S100 of calculating an offset time representing a difference between time information of the client 300 and time information that is received from each network camera 100 in response to a time information request to each network camera 100.

FIG. 4 is a detailed flowchart illustrating the authentication preprocessing operation illustrated in FIG. 3.

Referring to FIG. 4, the client 300 performs an operation S111 of requesting time information by transmitting a GetSystemDateAndTimeRequest command included in the ONVIF protocol to each network camera 100.

When each network camera 100 receives a time information request, each network camera 100 converts the time information of each network camera 100 into a UTC format and transmits information including GetSystemDateAndTimeResponse and time information of each network camera 100 to the client 300, and the client 300 performs an operation S113 of receiving the GetSystemDateAndTimeResponse and the time information of each network camera 100 from each network camera 100.

Thereafter, the client 300 performs an operation S115 of calculating and storing an offset time representing a difference between the time information of the client 300 and the time information of each network camera 100.

If, however, the client 300 does not receive time information, the client 300 performs an operation S117 of extracting time information from an HTTP header included in a failure response signal received from each network camera 100.

Thereafter, the client 300 performs an operation S119 of calculating and storing an offset time representing a difference between the time information of the client 300 and the time information of each network camera 100 extracted from the HTTP header. Then, the authentication preprocessing operation is ended.

Referring to FIG. 3, when the authentication preprocessing operation is ended, each network camera 100 performs an authentication processing operation S200 of authenticating the client 300 by receiving the authentication information including the offset time from the client 300 in response to an authentication request of the client 300.

FIG. 5 is a detailed flowchart illustrating the authentication processing operation illustrated in FIG. 3.

Referring to FIG. 5, the network camera 100 performs an operation S311 of receiving, from the client 300 that has requested authentication, the authentication information including a network camera ID, time information including an authentication request time and an offset time, and a password encrypted with the time information.

Thereafter, the network camera 100 performs an operation S313 of determining whether the network camera ID included in the authentication information has been registered in the network camera 100, and transmitting an authentication failure signal to the client 300 if the network camera ID included in the authentication information has not been registered in the network camera 100.

If, however, the network camera ID has been registered in the network camera 100, the network camera 100 performs an operation S315 of determining whether a difference between an internal time of the network camera 100 and the authentication request time included in the authentication information is greater than or equal to a critical value, and transmitting an authentication failure signal to the client 300 if the difference between the internal time of the network camera 100 and the authentication request time included in the authentication information is greater than or equal to the critical value.

If, however, the difference between the internal time of the network camera 100 and the authentication request time included in the authentication information is smaller than the critical value, the network camera 100 performs an operation S317 of generating a password by using the time information included in the authentication information.

Thereafter, the network camera 100 performs an operation S319 of transmitting an authentication success signal to the client 300 if the generated password is identical to the password included in the authentication information. Upon receiving the authentication success signal, the client 300 may access the network camera 100 and receive and monitor an image from the network camera 100.

If, however, the generated password is different from the password included in the authentication information, the network camera 100 performs an operation S321 of transmitting an authentication failure signal to the client 300.

As described above, according to the one or more of the above exemplary embodiments, since the client calculates and stores time bias information with respect to the network camera in the authentication preprocessing operation and the network camera authenticates the client by using the time bias information, the network camera does not need to perform a separate time change in order to authenticate the image processing device.

Also, a plurality of clients with different internal times may access one network camera.

The above embodiments may be embodied as computer readable codes on a computer-readable recording medium. The computer-readable recording medium may be any data storage device that may store data which may be thereafter read by a computer system.

Examples of the computer-readable recording medium include read only memory (ROM), random access memory (RAM), compact disk-read only memory (CD-ROM), magnetic tapes, floppy disks, optical data storage devices, and carrier waves (such as data transmission through the Internet). The computer-readable recording medium may also be distributed over network-coupled computer systems so that the computer-readable code may be stored and executed in a distributed fashion. Also, functional programs, codes, and code segments for accomplishing the present invention may be easily construed by programmers skilled in the art to which the inventive concept pertains.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the inventive concept have been described with reference to the figures, it will be understood by those of ordinary skill in the art that various changes in form and details may be made therein without departing from the spirit and scope of the inventive concept as defined by the following claims.

What is claimed is:

1. An authentication system that allows at least one network camera to authenticate an image storage device as a client, the authentication system comprising:
    a processor provided in the client and configured to implement an authentication preprocessing unit which calculates and stores an offset time representing a difference between time information of the client and time information of a network camera; and
    a processor provided in the network camera and configured to implement an authentication processing unit which authenticates the client by using authentication information including the offset time received from the client, in response to an authentication request of the client,
    the authentication preprocessing unit in the client controlling the client to transmit the offset time and a password of the client to the network camera,
    the authentication processing unit in the network camera generating a password based on the offset time received from the client, determining whether the generated password is identical to the password received from the client, and authenticating the client in response to the generated password being identical to the received password, and
    the authentication preprocessing unit transmitting a request for the time information of the network camera to the network camera and, in response to receiving a failure response signal from the network camera, extracting the time information of the network camera from a Hypertext Transfer Protocol (HTTP) header included in the failure response signal and calculating the offset time based on the extracted time information.

2. The authentication system of claim 1, wherein the authentication preprocessing unit periodically calculates and updates the offset time.

3. The authentication system of claim 1, wherein the authentication preprocessing unit comprises:
    a requesting unit configured to request the time information from the network camera by transmitting a GetSystemDateAndTimeRequest command included in an Open Network Video Interface Forum (ONVIF) protocol to the network camera; and
    a calculating unit configured to receive a GetSystemDateAndTimeResponse command included in the ONVIF protocol and the time information of the network camera from the network camera and calculate the offset time.

4. The authentication system of claim 1, wherein the authentication processing unit comprises:
    a receiving unit configured to receive from the client the authentication information including a network camera identification (ID), time information including an authentication request time and the offset time, and a password encrypted with the time information including the authentication request time and the offset time;
    a generating unit configured to generate the password by using the time information including the authentication request time and the offset time; and a control unit configured to transmit an authentication success signal to the client if the generated password is identical to the password included in the authentication information.

5. The authentication system of claim 4, wherein the time information including the authentication request time and the offset time is a sum of the authentication request time and the offset time.

6. The authentication system of claim 4, wherein the control unit transmits an authentication failure signal to the client if the network camera ID included in the authentication information has not been registered in the network camera, if a difference between an internal time of the network camera and the authentication request time included in the authentication information is greater than or equal to a critical value, or if the generated password is different from the password included in the authentication information.

7. The authentication system of claim 6, wherein the time information including the authentication request time and the offset time is a sum of the authentication request time and the offset time.

8. A method of operating an authentication system that allows at least one network camera to authenticate an image storage device as a client, the method comprising:
   an authentication preprocessing operation of calculating and storing an offset time representing a difference between time information of the client and time information that is received from a network camera in response to a time information request to the network camera and transmitting the offset time and a password of the client to the network camera; and
   an authentication processing operation of authenticating the client by using authentication information including the offset time received from the client, in response to an authentication request of the client,
   the authentication processing operation comprising generating a password based on the offset time received from the client, determining whether the generated password is identical to the password received from the client, and authenticating the client in response to the generated password being identical to the received password, and
   the authentication preprocessing operation comprising transmitting a request for the time information of the network camera to the network camera and, in response to receiving a failure response signal from the network camera, extracting the time information of the network camera from a Hypertext Transfer Protocol (HTTP) header included in the failure response signal and calculating the offset time based on the extracted time information.

9. The method of claim 8, wherein the authentication preprocessing operation comprises periodically calculating and updating the offset time.

10. The method of claim 8, wherein the authentication preprocessing operation comprises:
   requesting the time information from the network camera by transmitting a GetSystemDateAndTimeRequest command included in an Open Network Video Interface Forum (ONVIF) protocol to the network camera;
   receiving a GetSystemDateAndTimeResponse command included in the ONVIF protocol and the time information of the network camera from the network camera; and
   calculating the offset time.

11. The method of claim 8, wherein the authentication processing operation comprises:

receiving the authentication information including a network camera identification (ID), time information including an authentication request time and the offset time, and the password encrypted with the time information including the authentication request time and the offset time from the client that has requested authentication;
   generating the password by using the time information including the authentication request time and the offset time; and
   transmitting an authentication success signal to the client if the password is identical to the password included in the authentication information.

12. The method of claim 11, wherein the time information including the authentication request time and the offset time is a sum of the authentication request time and the offset time.

13. The method of claim 11, wherein the authentication processing operation further comprises:
   determining whether the network camera ID included in the authentication information has been registered in the network camera; and
   transmitting an authentication failure signal to the client if the network camera ID included in the authentication information has not been registered in the network camera.

14. The method of claim 13, wherein the authentication processing operation further comprises:
   if the network camera ID included in the authentication information has been registered in the network camera, determining whether a difference between an internal time of the network camera and the authentication request time included in the authentication information is greater than or equal to a critical value; and
   generating the password if the difference between the internal time of the network camera and the authentication request time included in the authentication information is smaller than the critical value, and transmitting the authentication failure signal to the client if the difference between the internal time of the network camera and the authentication request time included in the authentication information is greater than or equal to the critical value.

15. The method of claim 14, wherein the time information including the authentication request time and the offset time is a sum of the authentication request time and the offset time.

16. The method of claim 11, wherein the authentication processing operation further comprises transmitting an authentication failure signal to the client if the password is different from the password included in the authentication information.

17. An authentication system that allows at least one network camera to authenticate an image storage device as a client, the authentication system comprising:
   a memory storing computer executable instructions; and
   at least one processor configured to read and execute the computer executable instructions to implement an authentication processing unit to receive, from the client, an offset time and a password of the client, generate a password based on the offset time received from the client, determine whether the generated password is identical to the password received from the client, and authenticate the client in response to the generated password being identical to the received password, the offset time being calculated by the client and representing a difference between time information of the client and time information that is received from the at least one network camera in response to a time information request to the at least one network camera, and
wherein, when the at least one network camera transmits a failure response signal to the client in response to the time information request, the failure response signal comprising a Hypertext Transfer Protocol (HTTP) header in which the time information of the at least one network camera is included.

\* \* \* \* \*